(12) United States Patent
Hogan et al.

(10) Patent No.: US 7,526,403 B2
(45) Date of Patent: Apr. 28, 2009

(54) MORTAR BALLISTIC COMPUTER AND SYSTEM

(75) Inventors: Chris Hogan, Fort Wayne, IN (US); Kirt Christensen, Fort Wayne, IN (US)

(73) Assignee: Dahlgren, LLC, Minneapolis, MN (US)

( * ) Notice: Subject to any disclaimer, the term of this patent is extended or adjusted under 35 U.S.C. 154(b) by 1391 days.

(21) Appl. No.: 10/210,270

(22) Filed: Jul. 31, 2002

(65) Prior Publication Data

US 2004/0024566 A1 Feb. 5, 2004

(51) Int. Cl.
*G01C 9/00* (2006.01)
*C09G 1/16* (2006.01)
*G06T 11/20* (2006.01)

(52) U.S. Cl. .................. 702/152; 345/174; 345/419; 345/440.1; 345/636; 345/700; 702/130; 702/182

(58) Field of Classification Search .................. 235/379, 235/381, 384, 404, 405, 409; 701/50, 207, 701/211; 707/4, 156; 345/765, 786, 441, 345/440.1, 636, 810; 705/2, 4, 5, 26; 89/36.08, 89/41.01, 41.11; 702/130, 150, 152
See application file for complete search history.

(56) References Cited

U.S. PATENT DOCUMENTS

| | | | |
|---|---|---|---|
| 3,591,772 A | 7/1971 | McAdam, Jr. et al. | 235/405 |
| 3,739,152 A | 6/1973 | Frohock, Jr. et al. | 235/404 |
| 3,739,153 A | 6/1973 | Kendy | 235/409 |
| 3,743,818 A | 7/1973 | Marasco et al. | 235/404 |
| 4,365,149 A | 12/1982 | Falbel | 235/404 |
| 4,402,250 A | 9/1983 | Baasch | 89/41.11 |
| 4,470,042 A * | 9/1984 | Barnich et al. | 345/636 |
| 4,481,509 A * | 11/1984 | Sasaki et al. | 345/24 |
| 4,531,052 A | 7/1985 | Moore | 235/404 |
| 4,568,823 A | 2/1986 | Diehl et al. | 235/404 |
| 5,231,381 A * | 7/1993 | Duwaer | 345/174 |
| 5,672,840 A | 9/1997 | Sage et al. | 89/41.01 |
| 5,721,679 A * | 2/1998 | Monson | 701/207 |
| 5,731,997 A * | 3/1998 | Manson et al. | 702/150 |
| 6,202,026 B1 | 3/2001 | Nimura et al. | 701/211 |
| 6,473,080 B1 * | 10/2002 | Brown et al. | 345/419 |
| 6,553,333 B1 * | 4/2003 | Shenk | 702/182 |
| 6,577,714 B1 * | 6/2003 | Darcie et al. | 379/93.17 |
| 6,591,215 B1 * | 7/2003 | Blumenthal et al. | 702/130 |
| 2002/0030683 A1 * | 3/2002 | Alexander | 345/440.1 |
| 2003/0107588 A1 * | 6/2003 | Elsbree et al. | 345/700 |
| 2004/0021696 A1 * | 2/2004 | Molgaard | 345/810 |

FOREIGN PATENT DOCUMENTS

EP 0889388 A1 * 1/1999

* cited by examiner

*Primary Examiner*—John H Le
(74) *Attorney, Agent, or Firm*—Randall J. Knuth

(57) ABSTRACT

A software and related software operational system has both military and civilian uses and that can be operated as a light weight, hand-held, commercial, off-the-shelf computer device. The ballistic computer utilizes a display format that permits entry and display of both graphical and alphanumeric data simultaneously. This display and data entry format is especially applicable to the firing of mortars, allowing a representation of both where the mortar currently is and where it is projected to land.

21 Claims, 9 Drawing Sheets

Performs Weapon Setup

Performs Forward Observer Setup

26d

24d

| Setup | Weapon | FD | Ammo | Safety Fan | Mission | ✕ |

Type [HE 720 ▽]

Count [400]

Lot # [65 AC 1287-0101940-da]

Temperature [70] deg C

File  Help

40

IMFP

58

76

MBCE

Start

Performs Ammunition Setup

Fig. 5

Performs Safety Setup and Display

MORTAR BALLISTIC COMPUTER AND SYSTEM

BACKGROUND OF THE INVENTION

1. Field of the Invention

The present invention relates to a hand-held computational device configured for managing artillery fire tasks for a light infantry solider and, more specifically, for the quick input of firing mission data, the performance of calculations for each entered mortar or artillery piece, and the management of the various firing mission data.

2. Description of the Related Art

In order for the soldier to effectively target mortar fire, it has typically been necessary either to manually compute the launch data required or to use a full service computer to do so. Doing the targeting work manually typically requires the use of plotting and/or charting boards along with various data tables (generally referred to as the M-19 system). The manual use of these boards and data tables can be time-consuming, creating a certain time lag between firings and can provide the opportunity for human error during the process. Additionally, this manual system does not promote quick adjustments for such factors as changes in weather conditions (e.g., temperature, wind speed, humidity) and/or artillery weapon characteristics (e.g., change in barrel temperature; change in weapon used for launch; change in mortar type used). Moreover, the plotting/charting boards are relatively big, making handling and transport thereof difficult. Further, as the data is manually generated, associated record keeping must be physically performed.

Computers have been used in an attempt to overcome the limitations associated with the manual system. Such computers have been hardened computers designed specifically for military use and provided with a lot of expensive software, making them relatively expensive (i.e., on the order of thousands of dollars). Additionally, these computers are bigger than a laptop, making them somewhat large for field use and transport. Furthermore, such computers tend to use an LCD or LED display, displaying numerical data and being non-graphically oriented. This computerized system is known militarily as the M23 system.

For which ever system is employed to determine firing settings, it is important that it be able to incorporate a NATO ballistic kernel. This ballistic kernel works for a wide variety of rounds and types of armor. It not only works for just U.S. military weaponry but for all NATO-country-employed armament.

A further problem associated with each of the current M-19 and M-23 systems is that they are not conducive to rapid communication of artillery data between military units, including any forward observer(s) and any proximate friendly unit(s). Typically when using such systems, the operation orders and/or other mission data are hand-written, and runners are used for delivery thereof between such units. This mode of communication involves the risk of capture and/or injury of such runners and presents the opportunity to possibly improperly transcribe the firing settings for the given mission.

The alternative use of radio communications to instead relay the information is not without its potential drawbacks. Establishing a secure radio link is necessary. Further, the transmission system used must be resistant to signal jamming.

What is needed in the art is a readily portable system that facilitates the calculation of artillery firing settings in an accurate and timely fashion, the storage and manipulation of artillery fire data (including the calculated firing settings), and the secure communication of such data with other chosen units.

SUMMARY OF THE INVENTION

The present invention relates to a Windows CE-based piece of software and related software operational system that potentially has both military and civilian uses and that can be operated as a light weight, hand-held, commercial, off-the-shelf computer device. Militarily, Mortar Ballistic Computer Easy (i.e., MBCE) utilizes a display format that permits entry and display of both graphical and alphanumeric data simultaneously. This display and data entry format is especially applicable to the firing of mortars, allowing a representation of both where the mortar currently is and where it is projected to land. A variety of useful features may be derived from such an MBCE.

The present invention, in one form thereof, comprises a computational device, including: a central processor unit; at least one data entry mechanism communicatively connected with the processor unit; and a display screen configured as a split screen contextual interface. The display screen includes at least a graphical field and an alphanumeric field. The graphical field displays graphically plotted data, and the alphanumeric field depicts alphanumeric data. At least a portion of the graphically plotted data correlates contextually with the alphanumeric data.

The present invention comprises, in another form thereof, a target map display generated on a visual display device. The target map display includes a graphical field, a plurality of map coordinates, and at least one target location. The graphical field of the visual display device is configured for displaying at least one of mapped and plotted data. The plurality of map coordinates are designated within the graphical field. The plurality of map coordinates permit definition of the plurality of positions upon the geographical field. At least one target location is visually indicated within the graphical field. Each target location has a position definable using the map coordinates.

The present invention comprises, in yet another form thereof, a method of generating a firing setting of a munitions launch unit using a portable computation unit. The method includes the steps of inputting target data for a desired target, inputting munitions launch unit set-up data, inputting ammunition data, calculating firing data, generating a firing setting, and outputting the firing data and the firing setting. The step of inputting munitions launch unit set-up data is in regard to the munitions launch unit being employed. The step of inputting ammunition data is for the ammunition being used in the ammunition launch unit. The step of calculating firing data is based upon the target data, the munition launch unit set-up data, and the ammunition data. The step of calculating is performed using a ballistic kernel, the ballistic kernel employing at least one look-up table and triangulation to calculate the firing data. The step of generating a firing setting for the munitions launch unit is based upon the firing data. The step of outputting the firing data and the firing setting includes outputting this information to at least one of a display unit and a data link.

The invention, in yet another form thereof, comprises a method of selectively contacting at least one contactable entity. The method includes a plurality of steps, the first step being providing a computer system having a central processing unit, at least one data entry mechanism, and a display screen. The display screen has a graphical field associated therewith, the graphical field having at least one contactable entity plotted thereon. The method further includes a step of activating an area of the graphical field to thereby create an active field area. The active field area is chosen so as to activate each contactable entity located in the active field area. Each contactable entity located in the active field area thereby becomes an active contactable entity. The next step in the method is the step of contacting of each active contactable entity.

The present invention comprises, in an even further form, a display format for a display mechanism of a portable computational device. The display format includes a data entry field viewable on the display device and a plurality of tabs visible within the data entry field. Each tab is associated with a related data page, and each tab is configured for activation using at least one data entity mechanism associated with the portable computational device. One tab is activated as an active tab at any given time, and the data page related to the active tab is the only currently displayed data page. At least one data entry mechanism is configured for facilitating entry of data in the currently displayed data page.

The present invention, in yet another form thereof, comprises a computational device including a central processing unit, at least one data entry mechanism communicatively connected with the processor unit and a display screen including a graphical field. The graphical field displays graphically plotted data and the graphically plotted data is divisible into a plurality of graphical data subsets. At least one data entry mechanism is configured for facilitating a choice of which of the graphical data subsets are to be displayed at any given instant.

One advantage of the present invention is that the MBCE software facilitates the input, calculation, and graphical display of mortar firing data using a light weight, hand-held "cots" (i.e., commercial-off-the-shelf) computer device.

Another advantage of the present invention is that MBCE can be operated in a variety of mission modes including polar, shift, grid, adjustment, final protective fire (i.e., FPF), time on target (i.e., TOT), and GPS (i.e., Global Positioning System) modes. In adjustment mode, subsequent adjustments to initial rounds can be calculated. In FPF mode, final protective fire and other linear missions could be preformed. In TOT mode, time on target could use the MBCE's internal clock to signal the command to fire. In GPS mode, the MBCE could use data from a connected GPS to a firing position by updating the base gun's grid as the mortar firing unit travels.

Yet another advantage of the present invention is that it supports paperwork, records keeping, and planning in a variety of ways. The MBCE could fill out and store a series of data sheets for review or upload to a data server. The MBCE could fill out and store, via a computer, a record on each mission for review with the possibility of a series of computer records being stored by target number for a later upload to a data server. Further, the system can calculate and display safety cards to copy for the gunners. The system can also display and store a safety fan for each mission firing plan and ammo type. The system can display and store firing plans and target list worksheets. Furthermore, the MBCE could aid logistics by tracking rounds, signal to request rounds, request rounds itself automatically, and trend round consumption to predict logistics needs and the number of missions that can be fired on the remaining ammunition.

Another advantage of the MBCE system is the extreme mobility thereof, the system weighing approximately one pound with spare double AA batteries and a solar recharging unit and being compact enough to fit in a fanny/butt pack, in a small carrying pouch, or in a cargo pocket of a BDU uniform.

Another advantage of the MBCE is that it can be quickly setup. Manually, the MBCE can be set-up from blank in 30 seconds to 1 minute. From defaults, the previous settings can be stored as defaults, enabling set-up review in less than 30 seconds. Automatically, as in GPS mode, the map grid and any forward observers could be set-up automatically.

Another advantage of the MBCE system is that a munitions launch mission can be quickly initiated. Manually, a mission can be entered in 5 to 20 seconds, with firing data calculated immediately. Using a combination of a touch screen and accompanying stylus, a mission can be initiated and firing data calculated in less than 2 seconds by directly inputting the target grid on the situation map shown on this screen. Automatically, the mission can be initiated instantaneously when the MBCE unit is in communication with a hand-held Forward Observer Command Unit (FOCU).

Another advantage of the MBCE system is that round adjustments can be made in a similar manner as when using those techniques for initiating a mission and done so in a similar time frame. Another advantage is that any accuracy that might be lost against a six-degree of freedom calculation used to make the MBCE tabulations is gained in speed and targeting validity through the ability of getting round down range much faster than possible using other targeting methods.

Another advantage of the MBCE system is that it is relatively inexpensive to produce since commercially-available hand-held device platforms can be used to run the software, immediately reducing the cost per unit.

Another advantage of the hand-held MBCE platform is that it can be made to be relatively secure through use of password protection and through anticipation that the EPRON could be setup to erase upon external tampering with the device's container, for around a hundred dollars per unit.

Another advantage is multiple positions within a specific area map field can be designated simultaneously for receipt of a given message, warning and/or alert (e.g., via e-mail, phone, pager, and/or radio).

Another advantage of the invention is that it can provide for auto-fill of selected data and/or meteorological information, either from memory or a data link, as appropriate.

Another advantage of the invention is that the graphically plotted data shown on the display screen is divisible into a plurality into graphical data subsets, facilitating a choice of which graphical data subsets are to be displayed at any given moment. Such division permits layers of data (e.g., weapon units, friendly units, enemy units, reference points, and combinations/sub-combinations thereof) to be shown at any given instant.

Another advantage of the MBCE system is that tabbing of displayed data pages is used to minimize the amount of data displayed at any given time while permitting quick access to all the data/data entry positions, thereby allowing each data page to be displayed at a size that is easily viewed/read yet allow quick and ready access to the entirety of the available data.

Another advantage of the MBCE system is that it permits for a split screen contextual interface between a map field and an alphanumeric/data entry field of a display screen wherein entry of data in one of these two fields will effect, at least in part, the other field.

Another advantage is that the MBCE system is flexible in that it can be used while implementing various weapons data/lookup tables, including a standard NATO ballistic kernel that works for a variety of rounds in types of NATO artillery ammunition.

Another advantage is that the ballistic kernel used in the MBCE system is stripped-down relative to the ballistic kernels used in prior systems, the present invention using a program in C++ that is table-based and uses interpellation and trigonometry to arrive at the firing settings.

Another advantage is that the MBCE system permits the saving of mission data/calculations and possible use thereof for subsequent missions.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 5 is a split screen view of display unit of the present invention in which the ammunition set-up data page is tab-activated;

DETAILED DESCRIPTION OF THE INVENTION

Figure 1:
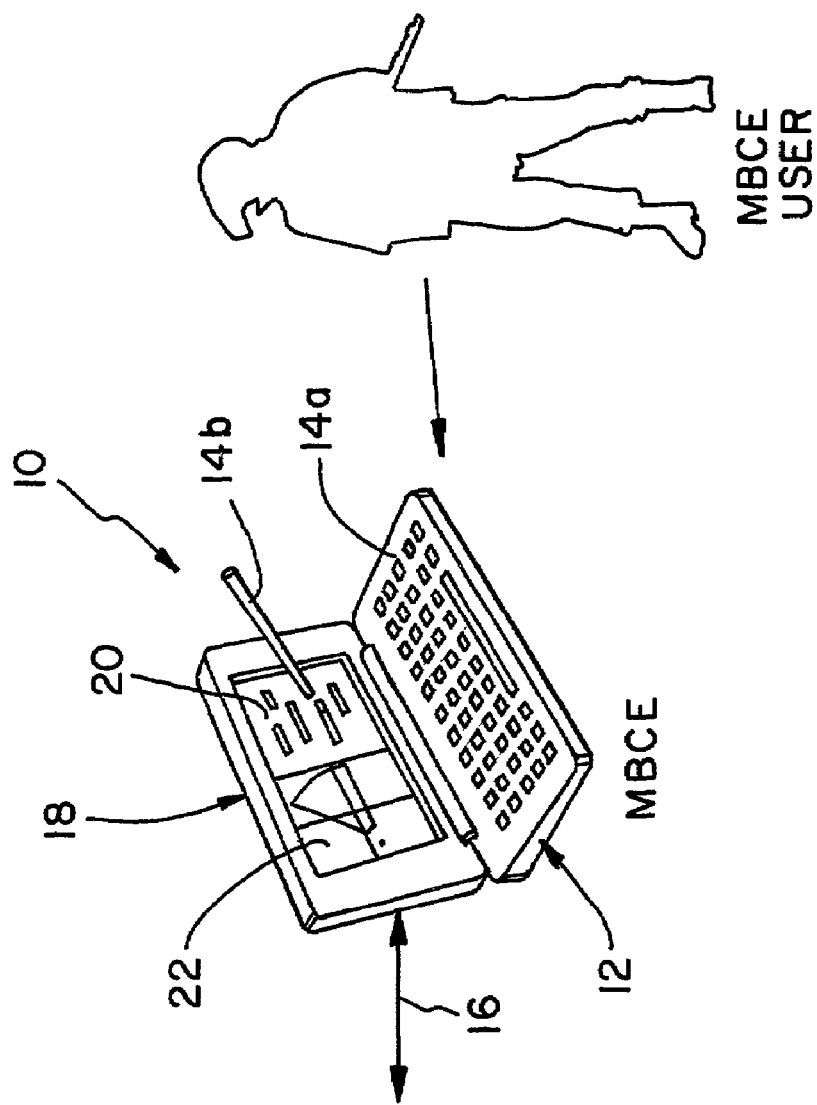
FIG. 1 is a schematic view of a computational device of the present invention having a display screen configured as a split screen contextual interface.
Figure 2:
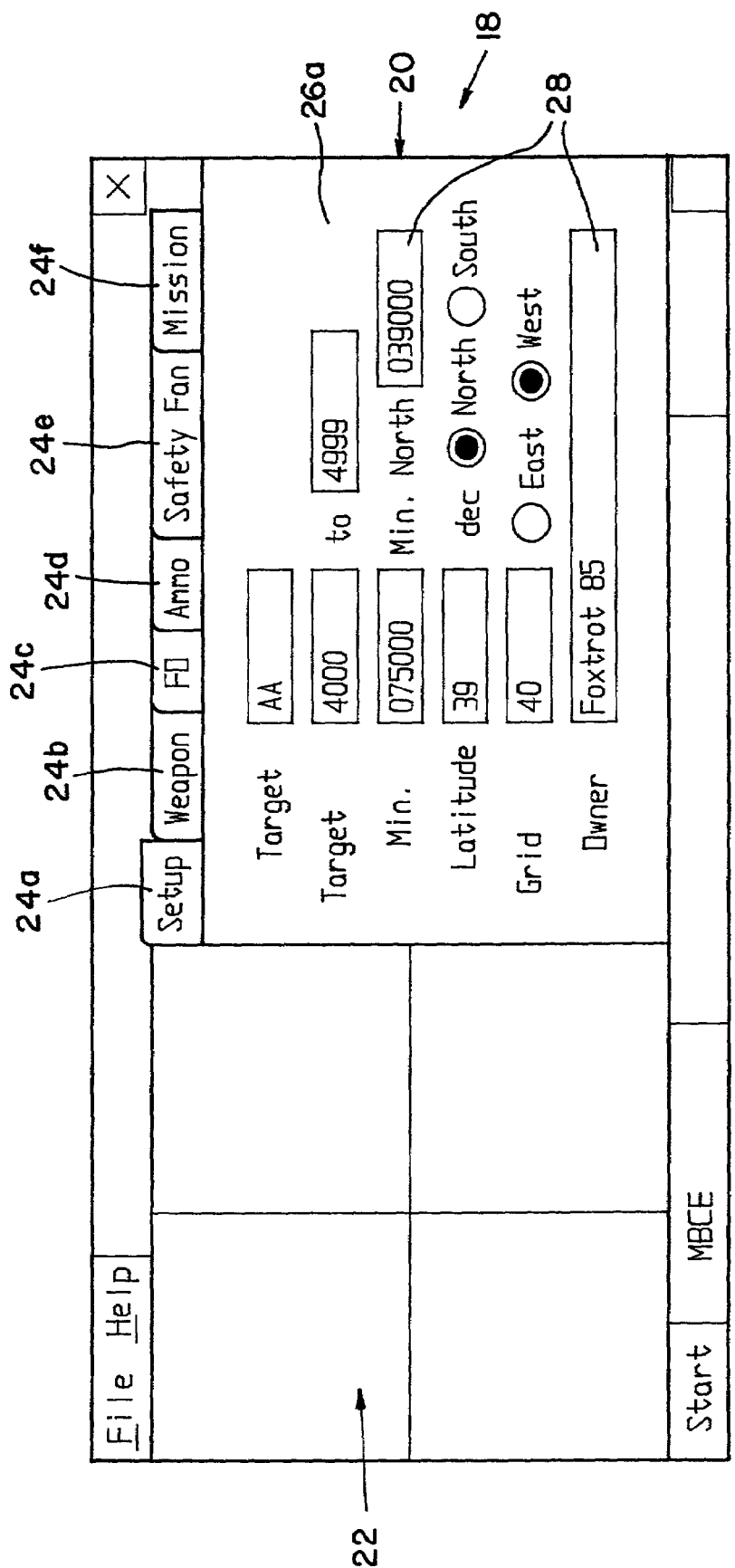
FIG. 2 is a split screen view of display unit of the present invention in which the general set-up data page is tab-activated.
Figure 3:
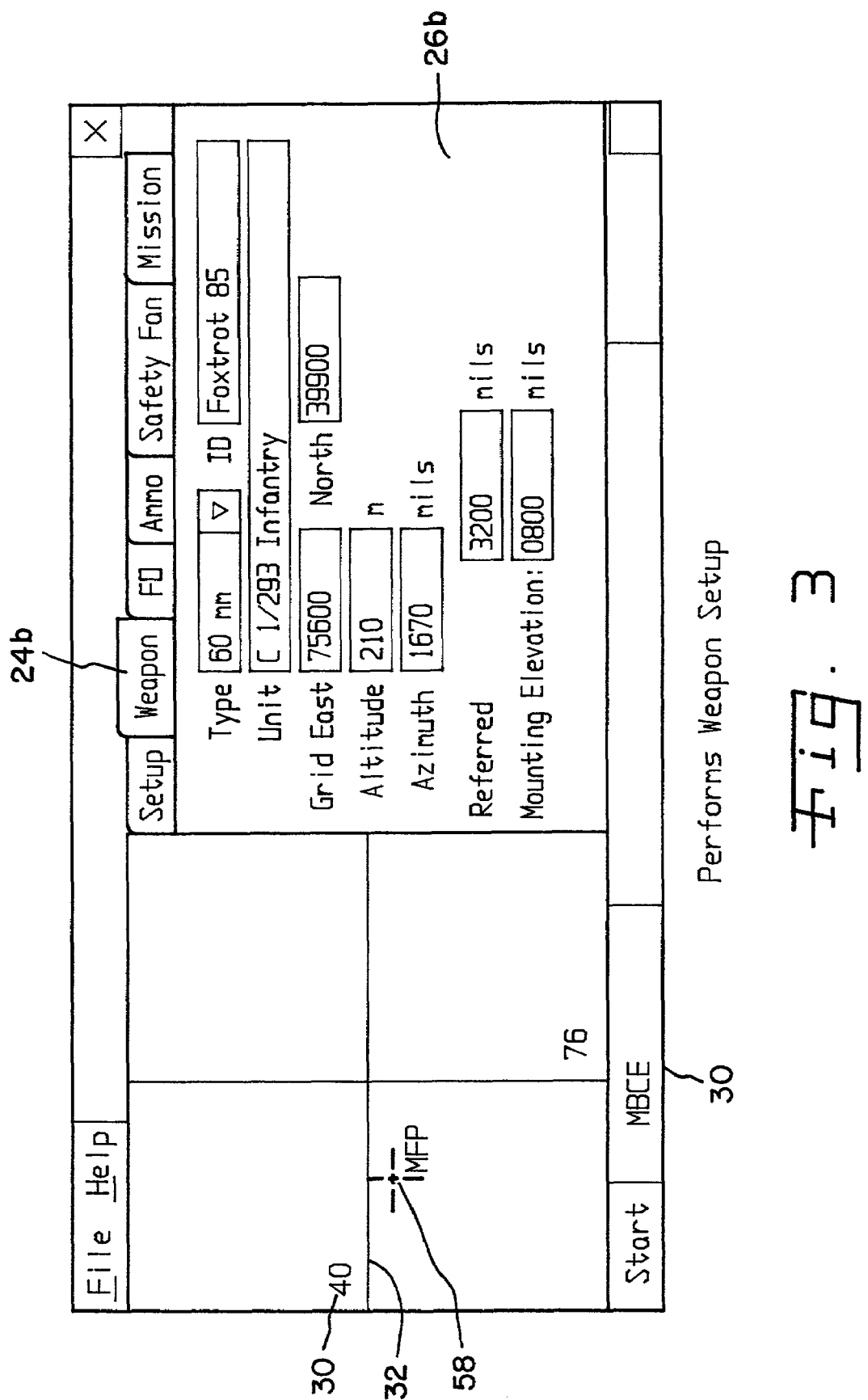
FIG. 3 is a split screen view of display unit of the present invention in which the weapon set-up data page is tab-activated.
Figure 4:
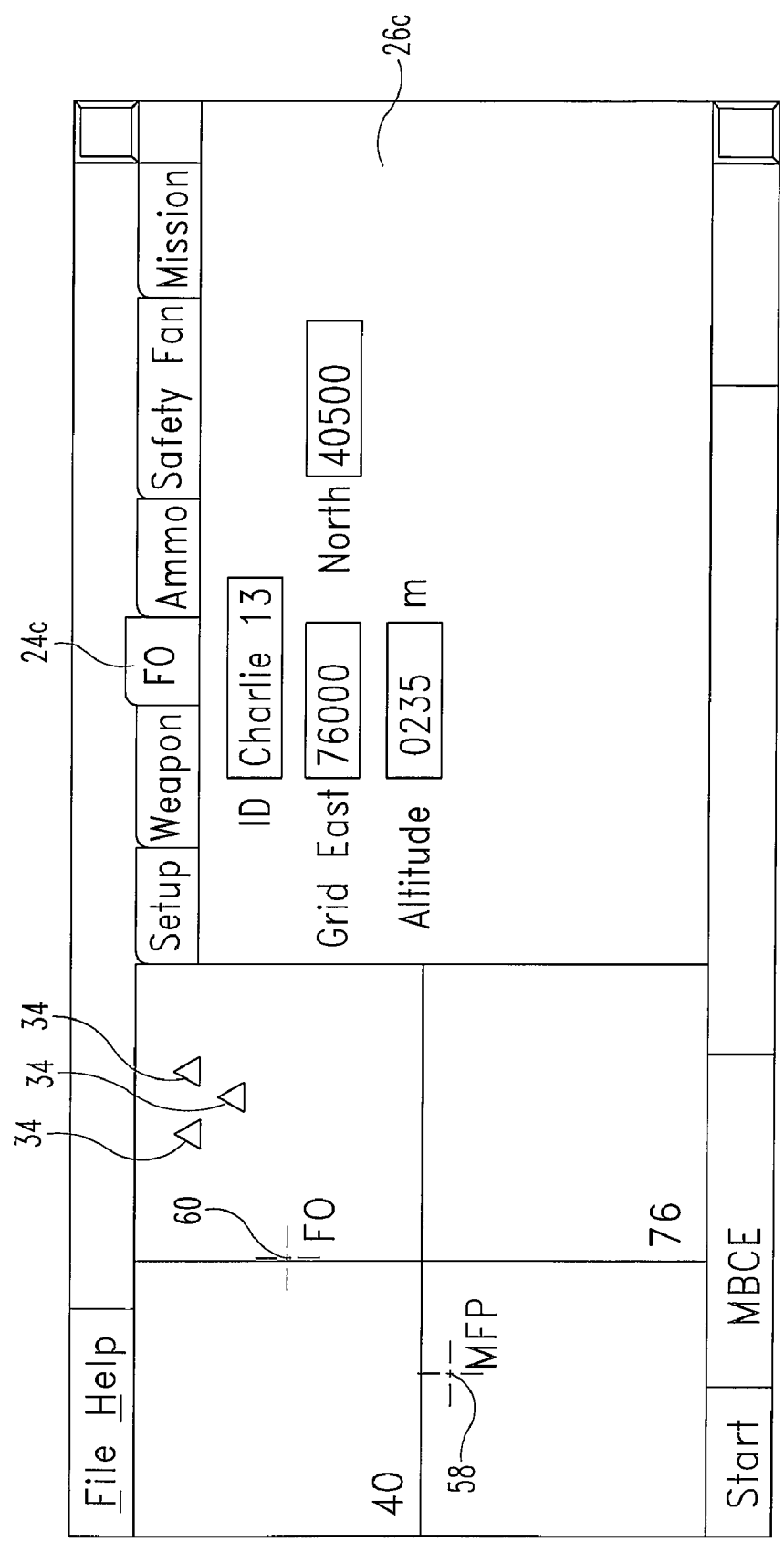
FIG. 4 is a split screen view of display unit of the present invention in which the forward observer set-up page is tab-activated.
Figure 6:
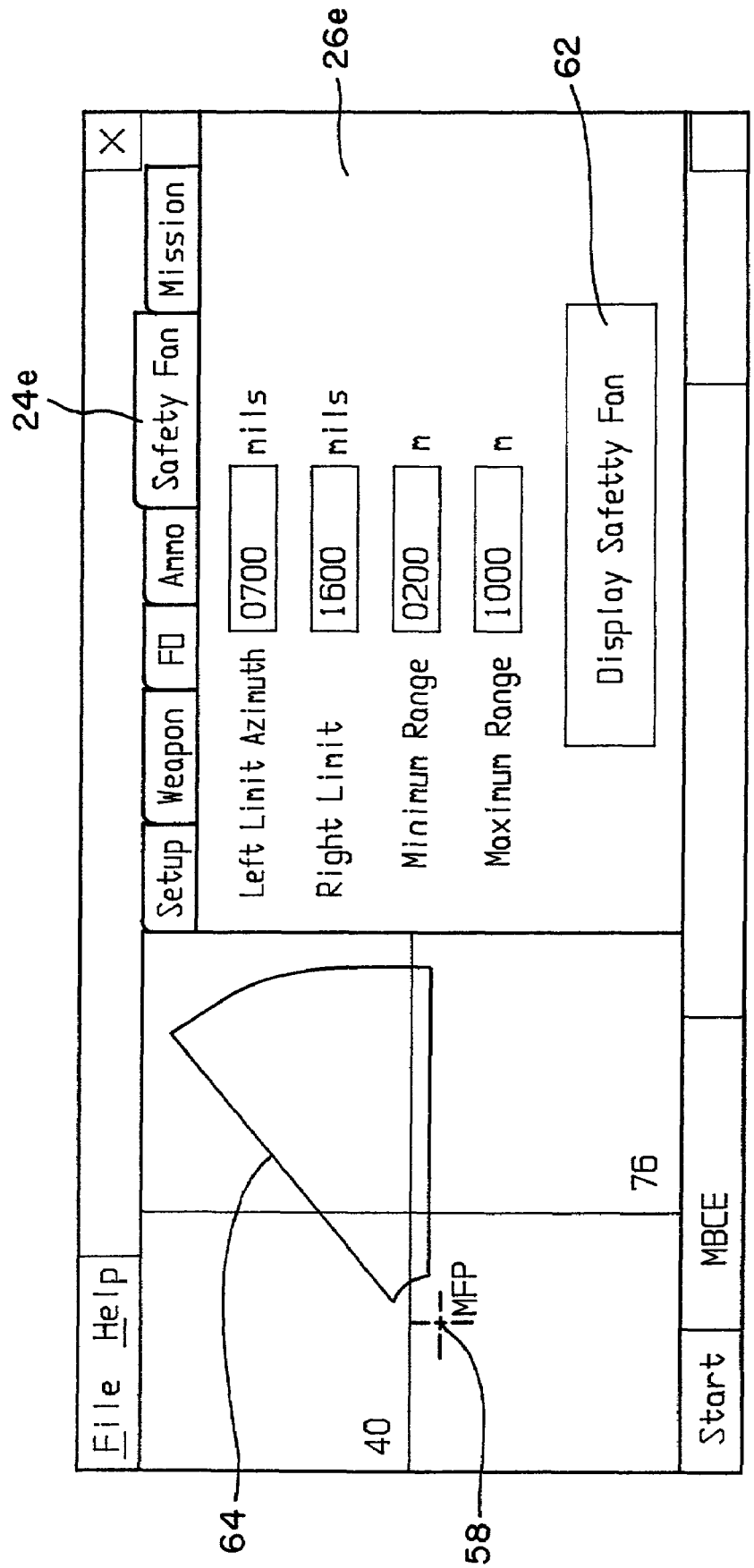
FIG. 6 is a split screen view of display unit of the present invention in which the safety set-up data page is tab-activated and at which point in the data entry sequence a safety fan is displayed.

The present invention, in one form thereof, as shown in FIG. 1, is a Mortar Ballistic Computer-Easy (MBCE 10) that includes a central processing unit 12, at least one data entry mechanism 14 (i.e., keyboard 14a and stylus 14b, as shown), a data link mechanism 16 (shown schematically), and a display screen 18. Display screen 18 includes an alphanumeric (data entry) field and a graphical (map) field.

MBCE (Mortar Ballistic Computer-Easy) 10 is a Windows CE-based, hand-held device used for the managing of artillery Fire Direction Center (FDC) tasks for the light infantry soldier. The MBCE 10 quickly receives fire mission data and performs calculations for each entered mortar or artillery piece. The MBCE set-up and mission gun data can be stored for later retrieval or discarded. Much of the paper work associated with operating the FDC in the past can be automated within the MBCE 10. The location of the Firing Point can be located on the ground automatically using the MBCE's built in GPS (global positioning system) connectivity. The weight, size, and cost of the CE device 10 makes it a real value for combat operations where speed and pack weight are an issue. The open systems architecture of the CE device 10 further enhances battlefield operations through its support of better communications and records keeping.

In a preferred embodiment of the invention, at least one data entry mechanism 14 includes keyboard 14a and stylus 14b. Keyboard 14a facilitates entry of alphanumeric data, while stylus 14b is configured to enter data via activation of points and/or locations on display screen 18. One other potential data entry mechanism 14 is a mouse mechanism (not shown).

Data link mechanism 16 can be any one of a radio transceiver, a wireless/cellular transceiver, a satellite dish, and a modem. Given that it is a military device, one requisite of data link mechanism 16, when employed in a military context, is that it be capable of providing a secure communication link.

The display screen 18 of a preferred embodiment of the present invention has a variety of features associated therewith. Display screen 18 is configured as a split screen contextual interface such that at least a portion of graphically plotted data in graphical field 22 has a contextual relation with alphanumeric data presented in alphanumeric field 20. Display screen 18 is configured as a touch screen mechanism, permitting entry of data and/or selective activation of locations and/or portions of alphanumeric field 20 and/or graphical field 22 via, e.g., the use of stylus 14b. Furthermore, alphanumeric field 20 includes a plurality of field tabs 24a-24f (FIGS. 2-7) associated with data pages 26a-26f, respectively. Each of data pages 26a-26f have one or more data input boxes 28 associated therewith.

Graphical field 22 has at least one set of map coordinates 30 associated with a corresponding map grid 32. It is typical to use map coordinates 30 to indicate each of a grid east and grid north location. However, a grid west coordinate and/or a grid south coordinate could instead be used, as long as one using the map of graphical field 22 were informed of the use of such a grid basis. Map 22 has at least one mapped entity 34 plotted in thereby located thereon. Each mapped entity 34 represents one of, e.g., a person, a group of people, a particular location, and a person or group of people who can be found at a particular location (e.g., town, building, floor of a building, particular area). In military terms a person would be a soldier, while a group of people could be any one of a troop, a platoon, a company, and a battalion, as well as any other military unit designation. A particular location indicated by one mapped entity 34 could be one of, e.g., a landmark, a physical structure, a building, a geographical location, and a military target. Even more specifically, mapped entity 34 could represent a particular floor or group of floors in a building.

The touch-screen mechanism (i.e., combination of stylus 14b and display screen 18) is integrated for activation of a selected portion or portions of alphanumeric/data entry field 20 and/or graphical/map field 22, thereby effectively permitting data entry directly via display screen 18. Consequently, one or more mapped entities 34 can be actively chosen on graphical/map field via use of the touch-screen mechanism. Specifically, to choose a single entity 34, stylus 14b can be touched directly to that location upon display screen 18 or can be used to form a trace around the perimeter thereof (e.g., encircle). Likewise, to actively choose a plurality of mapped entities 34, an encompassing trace can be drawn around that entire group. The use of an encompassing trace can also be used to select an area of map field 22 as an active field region, with all mapped entities 34 which are encompassed by the chosen area thereby becoming activated. Activation of a given mapped entity or entities 34 can be used to choose, e.g., a target or a receiver of a message being sent.

Data link mechanism 16 is communicatively linked with display screen 18, including graphical/map field 22. Thus, data link mechanism 16 is configured for commutatively contacting each actively chosen one of a person and a group of people, as shown on display screen 18. The step of actively choosing can be done one of graphically via the touch-screen mechanism via graphical/map field 22 or by choosing or entering their name or names via alphanumeric/data entry field 20.

The graphically plotted data (e.g., mapped entities 34) is divisible into a plurality of graphical data subsets. At least one data entry mechanism 14 is configured for facilitating a choice of which of the graphical data subsets are to be displayed at any given instant. This feature effectively allows layers of map data to be displayed within graphical/map field 22, thereby avoiding cluttering map field 22 with information that need not be currently viewed.

Each mapped entity 34 having an associated communication device (e.g., a person or group of people with a radio or cell phone) can be considered a contactable entity. Each contactable entity located in the active field area (i.e., within the perimeter trace created using stylus 14b) becomes an active contactable entity, thereby chosen to be contacted, e.g., via at least one of a radio transceiver, a wireless transceiver, a pager unit, a telephone, and an e-mail messaging device. Contact via one of such units can include transmitting data in at least one of graphical, alphanumeric, and audilbe form. The message delivered may be, e.g., a warning, an alert, and/or an information release.

The touch screen mechanism has a whiteboard feature associated therewith that can be used in conjunction therewith graphical field 22. The whiteboard feature enables stylus 14b to indicate a directional movement for an active portion of the graphical field 22. In a preferred embodiment this feature can be used to indicate both military unit movement that has occurred and to order new military unit movement. Via use of a data link, it would then be possible to inform one or more military units of movements that are occurring around them and to forward movement orders to each of these such units in a manner that could be readily and quickly understood.

In this embodiment, graphical/map field 22 represents a geographically-based map, and each contactable (mapped) entity 34 has an associated entity geographical location. The associated geographical map location determines a related entity plot location in graphical field 22.

With respect to a preferred embodiment of the present invention, alphanumeric/data entry field 20 is configured for entry of military mission data, and the graphical/map data field 22 is a military map field. At least a portion of the military mission data is graphically represented on the military map field.

Keyboard 14a and/or stylus 14b of MBCE unit 10 can be used to facilitate movement between data input boxes 28 in the currently displayed one of the data pages 26a-26f. Specifically with relation to keyboard 14a, a tab key (not labeled) can be used to move between a given adjacent pair of data input boxes 28. As appropriate, one or more data input boxes 28 may be enabled with an auto-fill capability, providing the option of automatic data entry one of via the computer memory and via a data link. Automatic data entry from the computer memory would permit entry of a particular alphanumeric string upon recognition of the entry of a first few characters within that string. Some examples of data that could be auto-filled via a data link are up-to-date satellite weather information downloaded from the internet and data transmitted from a mainframe computer.

The general steps involved in using MBCE system 10 to fire missions of mortar shells are generally illustrated in FIGS. 2-10. A general set-up step 36, a weapon set-up step 38, an ammunition recording/set-up step 40, a forward observer step 42, a step of displaying a safety fan 44, a step of displaying a forward observer location 46, a step of displaying a mission/mortar firing position 48, a step of displaying a target 50, a step of initiating a fire mission 52, a step of preforming adjustments to a mission 54, and a step of completing the mission 56.

General set-up step 36 (FIG. 2) sets up data that does not change between various missions and other operations. The user selects set-up data tab 24a, causing set-up data page 26a to appear on display screen 18. Input boxes 28 are displayed for entering target prefix, minimum east grid, minimum north grid, grid magnetic angle and owner I.D. (identification). Through the use of input boxes 28 on set-up data page 26a, a set of target grid coordinates are created. The user enters data into each data input box 28 using one or more of keyboard 14a, stylus 14b, and an auto-fill feature which may be associated with a given data input box 28. To move between input boxes 28, the tab key (not labeled on keyboard 14a) or stylus 14b can be used. The various mechanisms for data entry and movement between input boxes 28 discussed with respect to set-up data page 26a will hold true for each of data pages 26a-26f.

Weapon set-up step 38 sets up the gun/artillery piece with its location and direction of fire. The user selects weapon tab 24b to effect the display of weapon data page 26b. Input boxes 28 are displayed for entering weapon type, weapon I.D., military unit I.D., grid east/north location, altitude, gun mounting, aszimuth, referred deflection, and mounting elevation, thereby establishing a full set of map coordinates for a given particular weapon. In addition to using keyboard 14a and stylus 14b to enter data within alphanumeric field 20, the user can also tap the situation map/map field 22 in the location thereupon that the weapon is to be located. Through weapon set-up step 38, an entry for a weapon of specified type is created and plotted on map 20 in its appropriate location 58, designated as a set of cross hairs with the label M.P. next to it.

Forward observer (FO) set-up step (FIG. 4) sets up data for the FO, who orders the adjustment of fire via radio communications. The user selects FO tab 24c to view FO page 26c. Input boxes 28 are displayed for entering FO I.D., grid East/North map coordinates, and altitude. The user enters data in alphanumeric field 20 and/or map field 22 and moves between data input boxes 28 in the same manner as previously discussed. An entry for a FO of specified I.D. is thereby created and plotted on the map at FO location 60.

Ammunition set-up step 40 sets up data (as shown in FIG. 5) for the ammunition type and count on hand to help with paperwork and records tracking. The user selects ammo tab 24d to gain access to ammo data page 26d. Input boxes 28 are displayed for entering ammo type, count, lot number, and temperature. The ammo records are stored and tracked by lot number and ammo type for ammo count.

Figure 7:
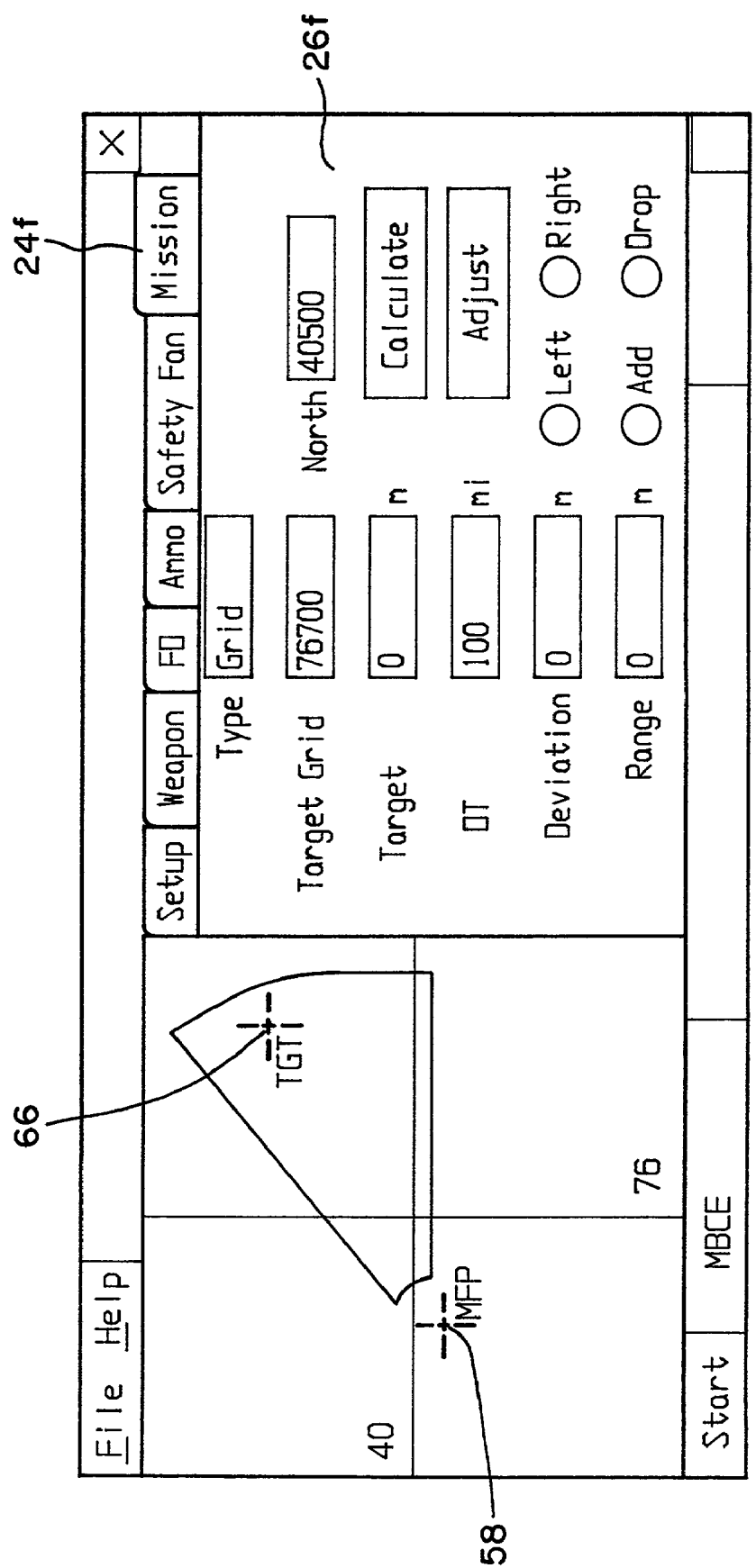
FIG. 7 is a split screen view of display unit of the present invention in which the mission data screen is tab-activated and at which location adjustment(s) to a mission may be initiated.
Figure 8:
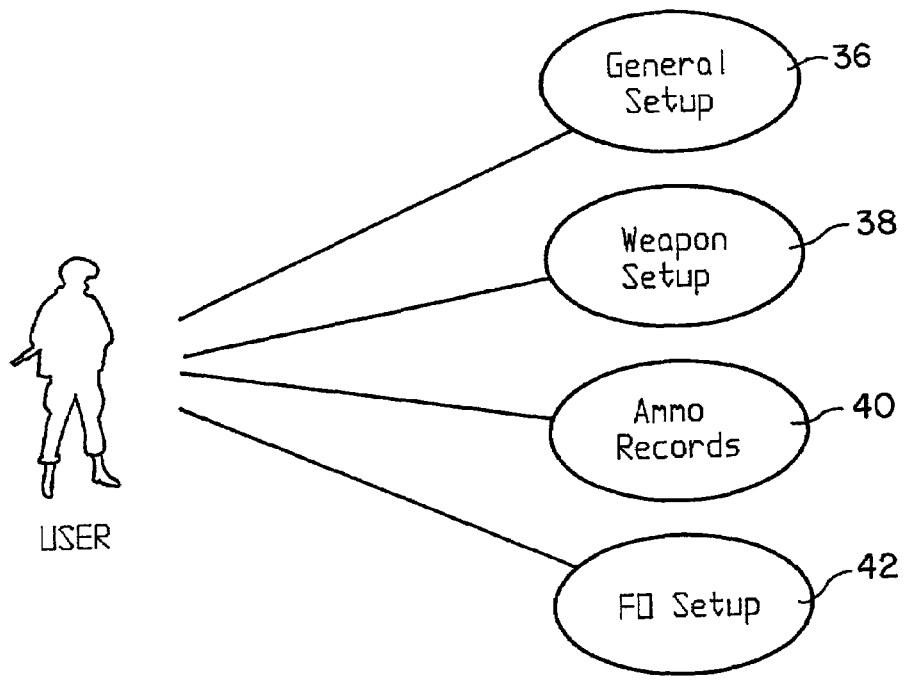
FIG. 8 is a schematic representation of the types of mission data with respect to the present invention that can be entered by an MBCE user.
Figure 9:
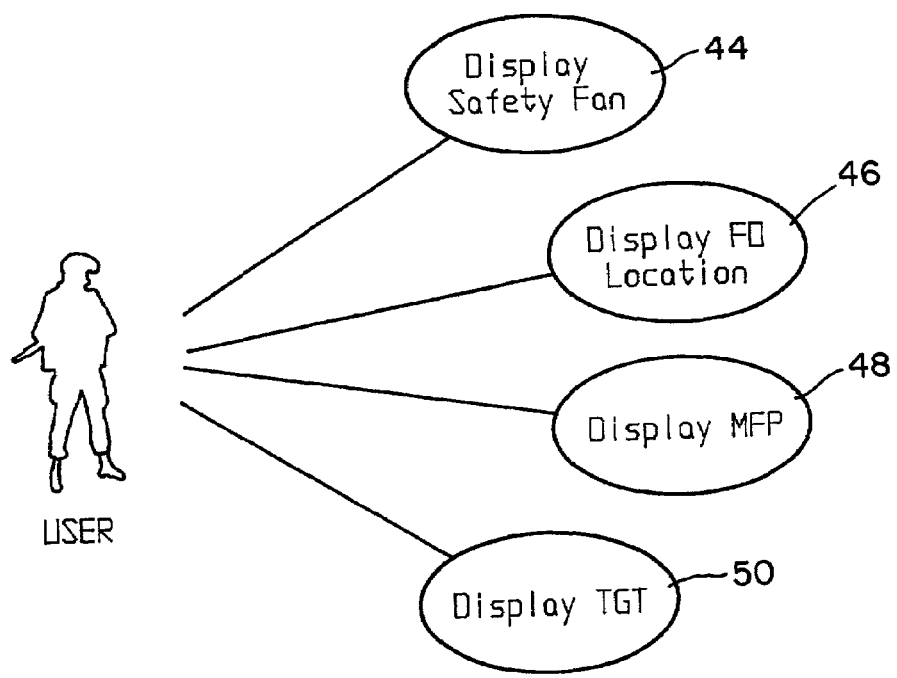
FIG. 9 is a schematic presentation of the mission data with respect to the present invention that is displayed to an MBCE user.
Figure 10:
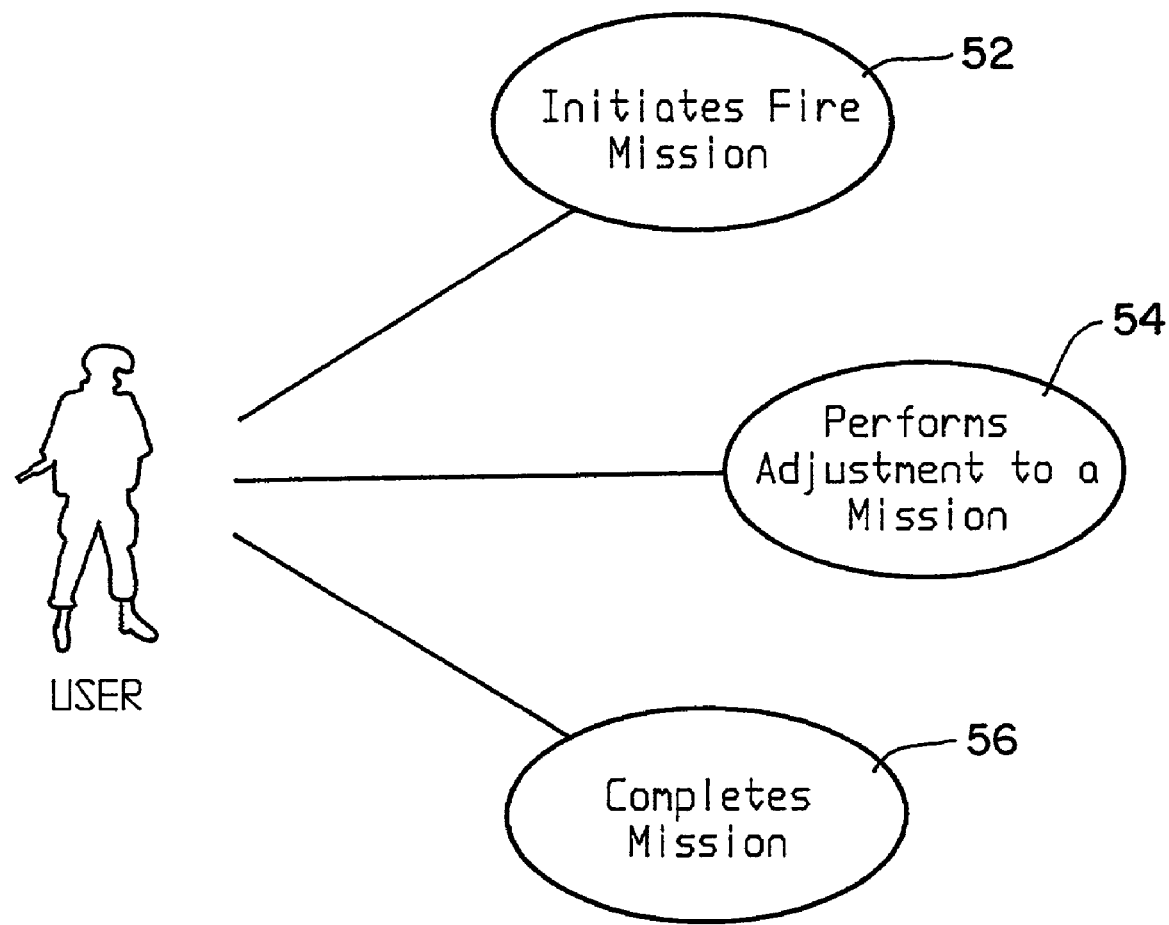
FIG. 10 is a schematic presentation of a user of the MBCE initiating a firing mission according to the present invention; and Corresponding reference characters indicate corresponding parts throughout the several views. The exemplification set out herein illustrates one preferred embodiment of the invention, in one form, and such exemplification is not to be construed as limiting the scope of the invention in any manner.

The step of setting up and displaying safety fan 44 (FIG. 6) allows the user to enter the safety information for his area of fire. Firings outside this fan will be warned against on map field 22 as being outside the boundaries of this fan. The user selects safety fan tab 24e to permit viewing of safety fan data page 26e. Input boxes 28 are displayed for entering a left limit, a right limit, a minimum range, and a maximum range. Upon entering the appropriate data, the user clicks a "display safety fan" button 62 to generate safety fan 64. Safety fan 64 is typically outlined in red or another distinct color (color not shown) on target map display field 22 along with other data such as weapon location 58, FO location 60, and target location 66 (FIG. 7). The user initiates fire mission step 52 by selecting mission tab 24f to enable mission data page 26f. The user selects the user type of grid, shift, or polar. Input for entering a 10-digit grid coordinate is displayed along with a combo box for target description. The user enters a mission grid coordinate and optional Observer Target Line (OT) direction if given. The user can tap the stylus to the situation map 22 in the location that the grid mission/grid coordinate is to be entered. The user selects, e.g., "infantry" from a first combo box and then selects, e.g., "in open" from a next box to make a complete target description of "infantry in open". The user is then directed to select a weapon from a weapon list box, 160 milometer mortar being the default in this instance. The user is directed to select a method of engagement including the number of rounds to fire (default being one) and shell/fuse type, with the list box defaulting to the type previously chosen. Upon entering all the appropriate information, the user clicks "calculate" button 68.

While this invention has been described as having a preferred design, the present invention can be further modified within the spirit and scope of this disclosure. This application is therefore intended to cover any variations, uses, or adaptations of the invention using its general principles.

What is claimed is:

1. A computational device, comprising:
   a central processor unit;
   at least one data entry mechanism communicatively connected with said processor unit; and
   a display screen configured as a split screen contextual interface, said display screen including at least a graphical field and an alphanumeric field, said graphical field being configured for displaying graphically plotted data, said alphanumeric field being configured for depicting alphanumeric data, at least a portion of the graphically plotted data correlating contextually with the alphanumeric data, said graphical field comprising a map, said map having a plurality of map coordinates associated therewith, said map coordinates being arranged and configured for permitting at least one position to be defined upon said map.

2. The computational device of claim 1, wherein at least one said data entry mechanism is one of a keyboard, a mouse and a touch screen mechanism, each said touch screen mechanism being integrated for activation via at least said graphical field of said display screen.

3. The computational device of claim 2, wherein one said data entry mechanism is said touch screen mechanism, said touch screen mechanism having a touch screen stylus associated therewith for graphical entry of data in said graphical field.

4. The computational device of claim 1, wherein said map has at least one mapped entity plotted and locatable thereon.

5. The computational device of claim 4, wherein at least one said mapped entity is one of a person, a group of people, and a particular location.

6. The computational device of claim 5, wherein at least one said mapped entity is a particular location, said particular location being at least one of a landmark, a physical structure, a geographical location, and a military target.

7. The computational device of claim 5, wherein at least one said mapped entity is one of a person, a group of people, and a particular location, at least one said data entry mechanism being a touch screen mechanism, said touch screen mechanism being integrated for activation via at least said graphical field of said display screen, at least one said mapped entity being actively chosen on said graphical field via said touch screen mechanism.

8. The computational device of claim 7, wherein each said mapped entity actively chosen is one of a person and a group of people, said computational device further including a data link mechanism, said data link mechanism being communicatively connected with said graphical field of said display screen, said data link mechanism being configured for communicatively contacting each said actively chosen one of a person and a group of people.

9. The computational device of claim 7, wherein each said mapped entity actively chosen is one said particular location, said computational device being configured for military targeting of at least one targeted site, each said actively chosen particular location becoming one said targeted site.

10. The computational device of claim 1, wherein said computational device is a hand-held device.

11. The computational device of claim 1, wherein said graphically plotted data being divisible into a plurality of graphical data subsets, at least one said data entry mechanism configured for allowing a choice of which of said graphical data subsets are to be displayed at any given instant.

12. A computational device, comprising:
    a central processor unit;
    at least one data entry mechanism communicatively connected with said processor unit; and
    a display screen configured as a split screen contextual interface, said display screen including at least a graphical field and an alphanumeric field, said graphical field displaying graphically plotted data, said alphanumeric field depicting alphanumeric data, at least a portion of said graphically plotted data correlating contextually with said alphanumeric data, said alphanumeric field including a plurality of field tabs associated therewith, each said field tab being associated with a particular data page for alphanumeric data entry and presentation.

13. A method of selectively contacting at least one contactable entity, said method comprising the steps of:
    providing a computer system having a central processing unit, at least one data entry mechanism, and a display screen, said display screen having a graphical field associated therewith, said graphical field having at least one contactable entity plotted thereon;
    activating an area of said graphical field to thereby create an active field area, said active field area being chosen so as to activate each said contactable entity located in said active field area, each said contactable entity located in said active field area thereby becoming an active contactable entity; and
    contacting each said active contactable entity.

14. The method of claim 13, wherein each said contactable entity is contactable via at least one of a radio, a wireless transceiver, a pager unit, a telephone, and an e-mail messaging device.

15. The method of claim 13, wherein said graphical field represents a geographically-based map, each said contactable entity having an associated entity map location, said associated entity map location determining a related entity plot location in said graphical field.

16. The method of claim 13, wherein said graphical field is configured for facilitating a selective identification of a selected areal portion thereof using at least one of a stylus and a mouse device.

17. The method of claim 16, wherein said step of activating including forming an encompassing trace around a perimeter of the selected areal portion to thereby define said active field area.

18. The method of claim 13, wherein said step of contacting includes transmitting data in at least one of a graphical, alphanumeric, and audible form.

19. The method of claim 13, wherein said step of contacting includes transmitting a message to each said active contactable entity via at least one of a radio, a wireless transceiver, a pager unit, a telephone, and an e-mail messaging device.

20. The method of claim 19, wherein said message is at least one of a warning, an alert, and an information release.

21. A computational device, comprising:

a central processor unit;

at least one data entry mechanism communicatively connected with said processor unit; and a display screen including a graphical field, said graphical field displaying graphically plotted data, said graphically plotted data being divisible into a plurality of graphical data subsets, at least one said data entry mechanism configured for facilitating a choice of which of said graphical data subsets are to be displayed at any given instant, said display screen being configured as a split screen contextual interface, said display screen including at least said graphical field and an alphanumeric field, said alphanumeric field depicting alphanumeric data, at least a portion of said graphically plotted data correlating contextually with said alphanumeric data, said graphical field represents a map field having map coordinates, each element of said graphically plotted data having a set of map coordinates associated therewith for facilitating plotting thereof upon said graphical field.

* * * * *